Feb. 14, 1928.

V. V. MESSER 1,658,852

TIRE TRIMMING MACHINE

Filed March 19, 1924     4 Sheets-Sheet 1

INVENTOR
VLADIMIR V. MESSER
BY
ATTORNEY

Feb. 14, 1928.

V. V. MESSER 1,658,852

TIRE TRIMMING MACHINE

Filed March 19, 1924     4 Sheets-Sheet 3

INVENTOR
Vladimir V. Messer
BY
ATTORNEY

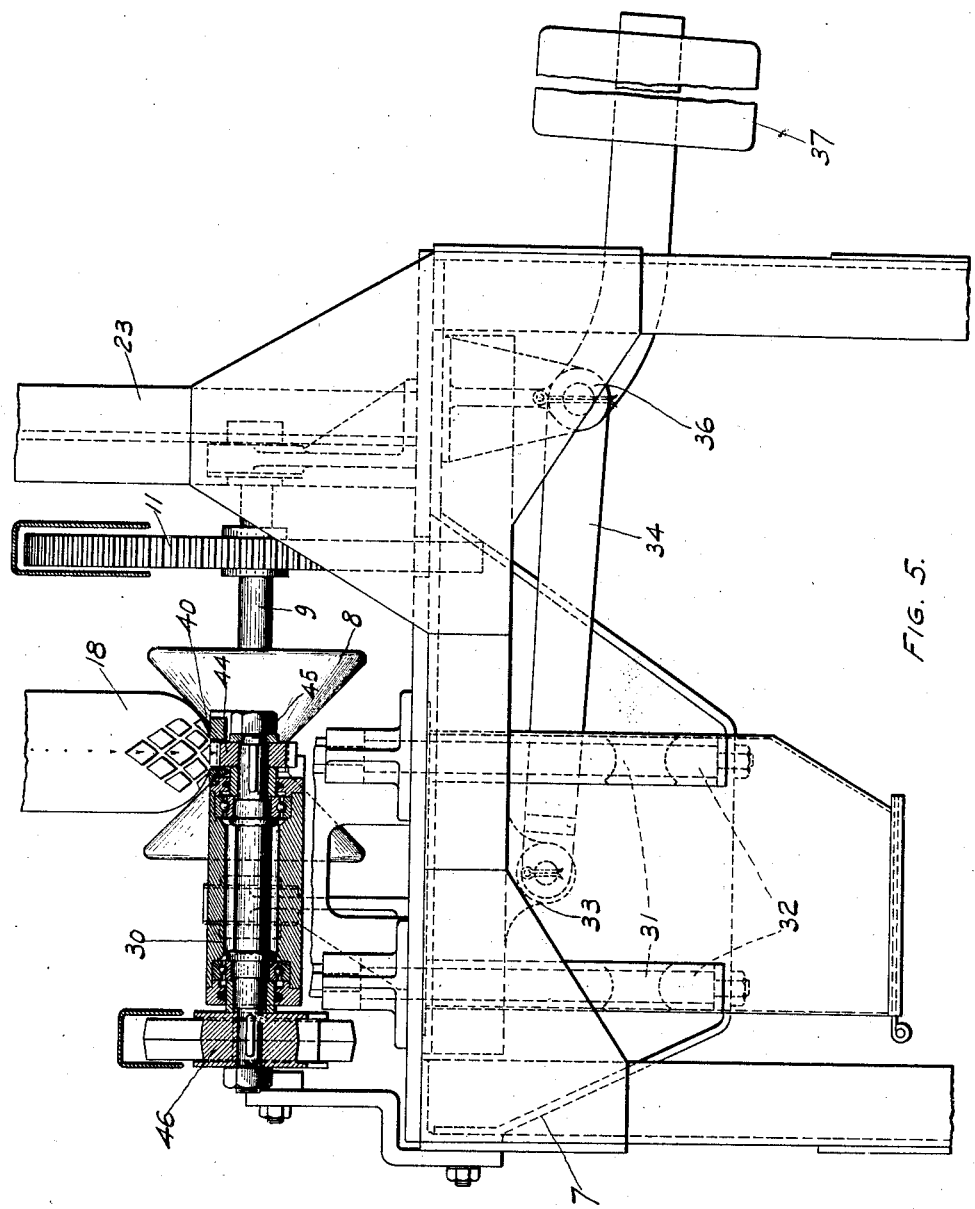

Patented Feb. 14, 1928.

1,658,852

UNITED STATES PATENT OFFICE.

VLADIMIR VICTOR MESSER, OF DOUGLASTON, NEW YORK, ASSIGNOR TO THE GOODYEAR TIRE & RUBBER COMPANY, OF AKRON, OHIO, A CORPORATION OF OHIO.

TIRE-TRIMMING MACHINE.

Application filed March 19, 1924. Serial No. 700,431.

My invention relates to a machine for trimming rubber tires and the like, and it has particular relation to a novel type of automatic machine for removing unsightly excess material therefrom.

The object of my invention is to provide a novel type of automatic apparatus for severing mold overflow or other undesirable protuberances, from the surface of the tire annulus without injuring the surface of the tire.

In the manufacture of tires, it has been customary to cure the tire by placing a tire carcass, provided with an uncured or semi-cured tread member, in a metallic tire mold, which consists of two circular concave annuli which are rigidly fastened together. By means of an air bag, or other flexible fluid container disposed within the carcass, the tire tread is forced into intimate contact with the inner surface of the mold. The tread, as originally applied to the carcass, has a plain surface, and the pressure exerted on the carcass by the air bag forces the rubber in the tread into the various indentures provided on the inner surface of the tire mold, to form the tread protuberances. In forcing the rubber into the indentures in the mold, a certain amount of air is trapped therein, and, in order to permit the escape of this air, small vent holes are provided at the junction of the two sections of the tire mold.

Also, in order that all of the indentures of the tire mold may be entirely filled, so as to provide a perfect tread design, it has been found desirable to have the quantity of rubber in the green tread as applied to the carcass, slightly greater than the total quantity desired in the tread of the tire. This very small excess is forced, by the pressure of the air bag, into all of the corners of the recesses, while yet uncured, and expels the air trapped therein through the vent holes provided at the junction of the mold sections. The slight excess of rubber is then forced into the vent holes, causing a series of small integral tongues or protuberances along the line representing the junction of the two sections of the mold. They are cured in this position, and, when removed from the mold, present a somewhat unsightly appearance which detracts somewhat from the attractiveness of the tire design, and must therefore be removed.

Heretofore, it has been customary to remove these small protuberances by hand by means of a knife provided with a V-shape cutting edge. The tire is rotated in a circumferential direction by hand, and the knife passed thereover by the operator, so as to sever the projections in question.

The objection to the above-mentioned method of trimming the tires is that it is inefficient and therefore expensive, and the results produced thereby differ widely with the various operators.

By my invention, I have provided a machine which eliminates both of these objections, as it permits one operator to trim a greatly increased number of tires, and it occupies less space than that required by the equivalent number of hand trimmers. Also, it produces a consistently better result, in that all of the tires are trimmed exactly alike, and may be trimmed as close to the tread as is desired.

With these and other objects in view, my invention will be more fully described and illustrated in the accompanying drawings, and clearly defined in the appended claims.

In the drawings, Fig. 1 is a perspective view of a machine constructed in accordance with my invention with a tire in position for trimming.

Fig. 5 is a sectional view of the machine illustrated in Figs. 1 and 2, illustrating particularly the balancing mechanism provided for the cutting member.

Figure 1:
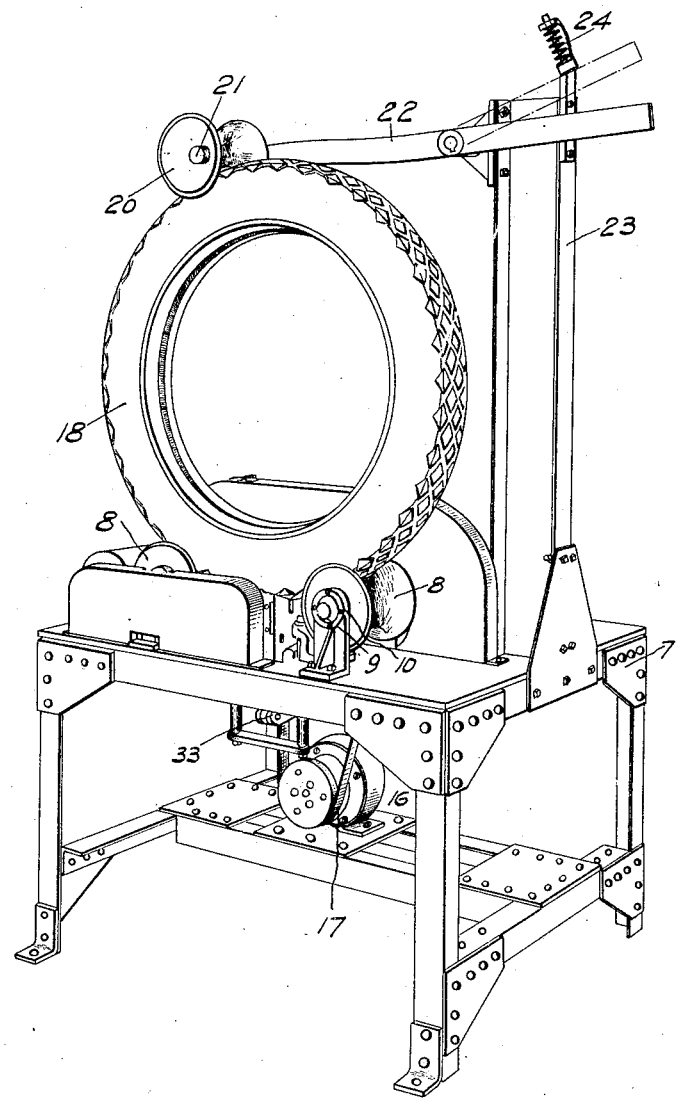
Figure 2:
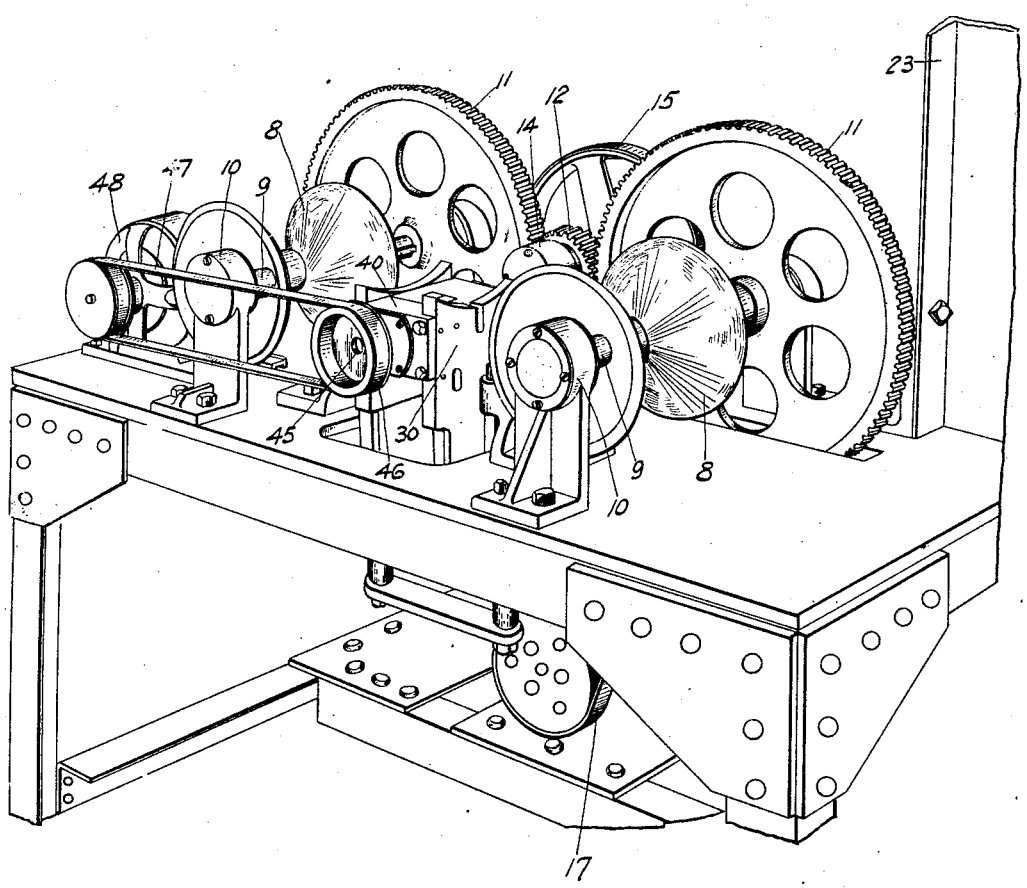
Fig. 2 is a perspective view of the central portion of the machine shown in Fig. 1, with guards removed, illustrating in detail the construction thereof.
Figure 3:
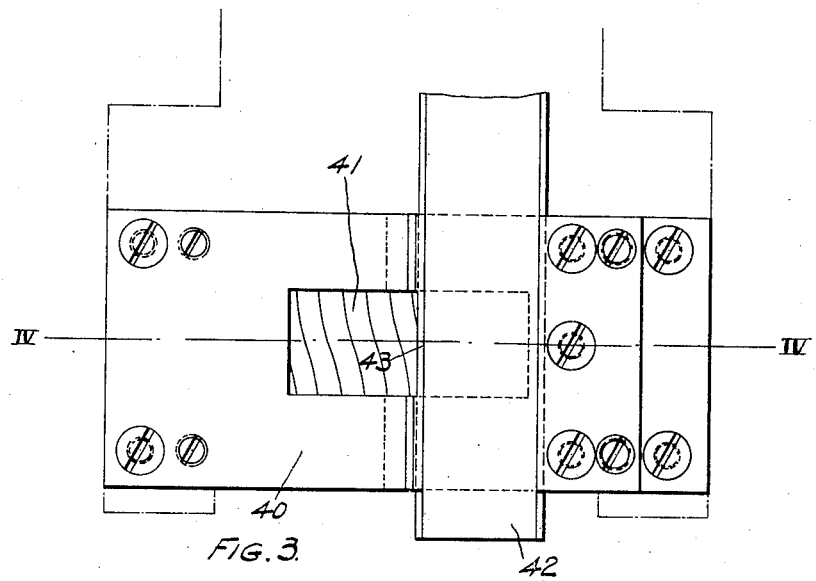
Fig. 3 is a plan view of the rubber cutting member.
Figure 4:
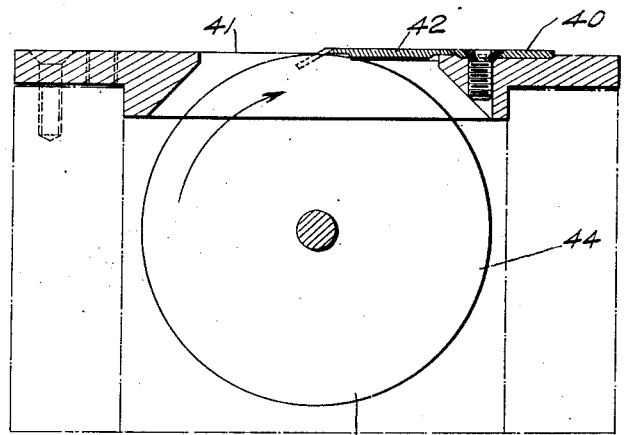
Fig. 4 is a sectional view of the structure illustrated in Fig. 3, the section being taken along the line IV—IV thereof.

In the drawings, I show a machine comprising a supporting stand 7 upon which are mounted two spaced concave rollers 8 by means of rotatable shafts 9, mounted within suitable bearings 10. The shafts 9 are provided with relatively large gear wheels 11, which drive the shaft 9 and the rollers 8, and which in turn are driven by a relatively small gear wheel 12 mounted upon a suitable axle (not shown), supported by suitable bearings 14. Rigidly mounted upon this axle is a pulley 15, which is driven by an electrical motor 16 by means of a belt 17. By means of the described arrangement of pulleys and gear wheels, the roller members 8 are driven at a considerably slower speed than that at which the motor 16 operates. The function of the roller member 8 is to support the greater portion of the weight of a tire annulus 18, as illustrated in Fig. 1, and to rotate the same in circumferential direction.

Cooperating with the rollers 8 is a similarly shaped angularly spaced concave roller member 20, which operates as an idler and engages the tire annulus adjacent its highest point, and serves to retain it in a vertical position while it is being rotated by the roller members 8. The roller member 20 is rotatably mounted upon an axle 21, which is supported upon a lever member 22, which in turn is pivotally mounted upon an upright standard 23 supported from the stand 7. The weight of the roller member 20 serves to keep it in firm engagement with the top of the rotating annulus 18. A spring member 24 mounted on the upright standard 23 serves as a buffer for the pivotally mounted member 22, and engages the end thereof when the tire is removed from the machine, eliminating any possibility of shock to the roller member 20.

In operation, the tire annulus is placed in position by an operator, who places it upon the two roller members 8, raising the roller member 20 until the top side of the tire will pass thereunder. The roller member 20 is then released so that it may engage the tire to hold it in a vertical position. The roller members 8 and 20 are, of course, arranged in a single vertical plane. Both roller members 8 are driven to rotate the tire circumferentially.

The cutting member comprises a supporting member 30, which is adapted for vertical movement relative to the rollers 8 and the stand 7, and is provided with roller members 31 which engage stationary vertical guide members 32 on the frame 7 to maintain the member 30 in a vertical plane. The member 30 is provided, at its lowermost point with a unitary supporting member 33, which is pivotally attached to a lever 34 by means of a pin 35. The lever 34 is in turn pivotally mounted upon a pin 36 mounted in the stand 7, and is provided, at its opposite end, with a counterbalancing weight member 37 which serves to maintain the member 30 in its uppermost position.

The member 30 is provided with a relatively broad upper or contact face 40, which is provided with a substantially centrally disposed opening 41. A portion of the face 40 consists of a flat knife member 42, which is provided with a cutting edge 43 constituting one edge of the aperture 41. The knife 42 is longitudinally adjustable, so that when the cutting edge 43 adjacent to the opening 41 is dulled, it may be moved and secured in a new position so as to provide a fresh cutting edge therefor. Disposed within the member 30 is a rotatable cutting element 44, mounted upon a shaft 45. The member 44 is provided with a plurality of helical knives adapted to cooperate with the cutting edge 43 of the member 42, to sever any projections which may come therebetween.

The knife edge of the member 43 is very slightly below the surface of the member 40, as is the highest point attained by the rotating knives in the member 44. By this arrangement, only those protuberances which project beyond the general tread surface engaged by the relatively broad face of the member 40 are severed. The cutting member 44 is rotated at a relatively high rate of speed, by means of a pulley member 46 mounted upon the shaft 45, which is driven by a belt 47 from a motor 48.

When there is no tire in position upon the rollers 8, the member 30 is held in its uppermost position by the action of the weight member 37. When a tire is placed upon the rollers 8, it first engages the face 40 of the member 30. Owing to the fact that the upward force exerted thereon by the weight 37 is but slightly in excess of the downward thrust exerted by the weight of the member 30, the member 30 is moved downwardly by the weight of the tire until the tire is supported by the rollers 8. By reason of its resilient mounting, the member 30 remains in contact with the periphery of the tire at its lowermost point. As the junction point of the two sections of the mold in which the tires are cured occurs in the center of the tread, the small projections caused by the rubber entering the vent holes occur in the center of the tread, as best illustrated in Fig. 5. The broad face 40 of the member 30, engaging the tire surface, prevents the cooperating knives 42 and 44 from injuring the surface of the tire, but the overflow extends below the main surface of the tire tread and projects into the opening 41, and is severed by the cooperation of the knives 42 and 44.

Thus, the roller members 8 rotate the tire in a circumferential direction, thus permitting the various portions of the mold overflow to successively project into the opening 41 in the cutter face and be severed from the tire. The motors 16 and 48 may be controlled by any suitable switching arrangement, if desired, but it will usually be found advisable to permit them to drive the rollers 8 and the cutting member 45, respectively, continuously. After the tire has been completely trimmed, that is, after it has completed a full revolution, it is removed from the machine by the operator by raising the roller 20 and raising the tire from the rollers 8.

From the foregoing description, it will be apparent that I have provided a tire trimming machine which can be arranged to trim any undesirable projections from any portions of the tire, as may be desired, and which is entirely automatic in its operation after the tire has been placed therein.

It will be apparent that a machine constituted in accordance with my invention is applicable for the trimming of both pneumatic and solid rubber tires, since both are manufactured by means of sectional molds, and the problem of the removal of the mold overflow is present in the manufacture of both types.

Although I have illustrated but one form of my invention, and have described in detail but a single application thereof, it will be apparent to those skilled in the art that it is not so limited but that various minor modifications and changes may be made therein without departing from the spirit of my invention, or from the scope of the appended claims.

What I claim is:

1. A machine for trimming rubber tires, comprising means for supporting and rotating a tire circumferentially, and means adapted to resiliently engage said tire and to trim excess rubber therefrom.

2. A machine for trimming rubber tires, comprising means for supporting and rotating a tire circumferentially, and a rotatable knife element adapted to resiliently engage said tire and sever the mold overflow therefrom.

3. A machine for trimming rubber tires, comprising means for rotating a tire circumferentially, and means adapted to be held in resilient engagement with said rotating tire, said last named means comprising a stationary knife blade and a rotatable knife, said knives being adapted to cooperate to sever undesirable protuberances from said tire.

4. A machine for trimming rubber tires, comprising means for supporting a tire in a vertical position and for rotating it circumferentially, and means for trimming the mold overflow from said tire comprising a relatively stationary member adapted to be held in resilient engagement with the periphery of said tire and provided with cooperating stationary and rotatable knives, and means for driving said rotatable knife.

5. A tire trimming device comprising a member adapted to be held in resilient engagement with a tire and adapted for relative movement with respect thereto, said member being provided with cooperating relatively movable cutting edges.

6. A tire trimming device comprising a member adapted to be held in resilient engagement with a tire and adapted for relative movement with respect thereto, said member being provided with a knife fixed with respect to said member and a cooperating power-driven rotatable cutting element.

7. A tire trimming device comprising a member adapted to be held in resilient engagement with a tire and adapted for relative movement with respect thereto, said member being provided with a relatively stationary knife member adapted for longitudinal adjustment, and a cooperating power-driven rotatable cutting element.

8. A tire trimming device comprising a member adapted to be held in resilient engagement with a tire and adapted for relative movement with respect thereto, said member being provided with an opening in the tire engaging surface, and cooperating cutting elements disposed within said opening and adapted to sever protuberances which extend thereinto.

9. A tire trimming machine comprising means for supporting and rotating a tire, a member provided with cooperating cutting edges adapted to trim mold overflow from said tire, said member being disposed upon a pivotally mounted member constituting a lever of the first class, and a weight member mounted on the opposite end of said lever and adapted to hold said cutting member in resilient engagement with said tire.

10. A tire trimming machine comprising two spaced concave roller members adapted to support and rotate a tire circumferentially, a third concave roller member spaced from said members and adapted to maintain said tire in a vertical position, and means disposed intermediate said supporting roller members adapted to resiliently engage the periphery of said tire and to sever undesirable projections therefrom.

11. A tire trimming machine comprising two spaced concave roller members adapted to support and rotate a tire circumferentially, a third concave roller member spaced from said member and adapted to maintain said tire in a vertical position, and means disposed intermediate said supporting roller members and adapted to resiliently engage the periphery of said tire with a relatively large engaging surface, said surface being provided with a relatively small aperture, cutting members disposed within said aperture and adapted to sever projections which extend thereinto.

12. A tire-trimming machine comprising a support, means thereon for supporting and peripherally driving a tire, and a trimming device mounted on said support and adapted to be brought into trimming engagement with the tread portion of said tire.

13. A tire-trimming machine comprising a support, means thereon for supporting and peripherally driving a tire, and a trimming device mounted on said support and adapted to be brought into trimming engagement with the tread portion of said tire, said supporting and driving means including a rotary member adapted to support the tire radially at a point closely adjacent said trimming device.

In witness whereof, I have hereunto signed my name.

VLADIMIR VICTOR MESSER.